Patented May 29, 1945

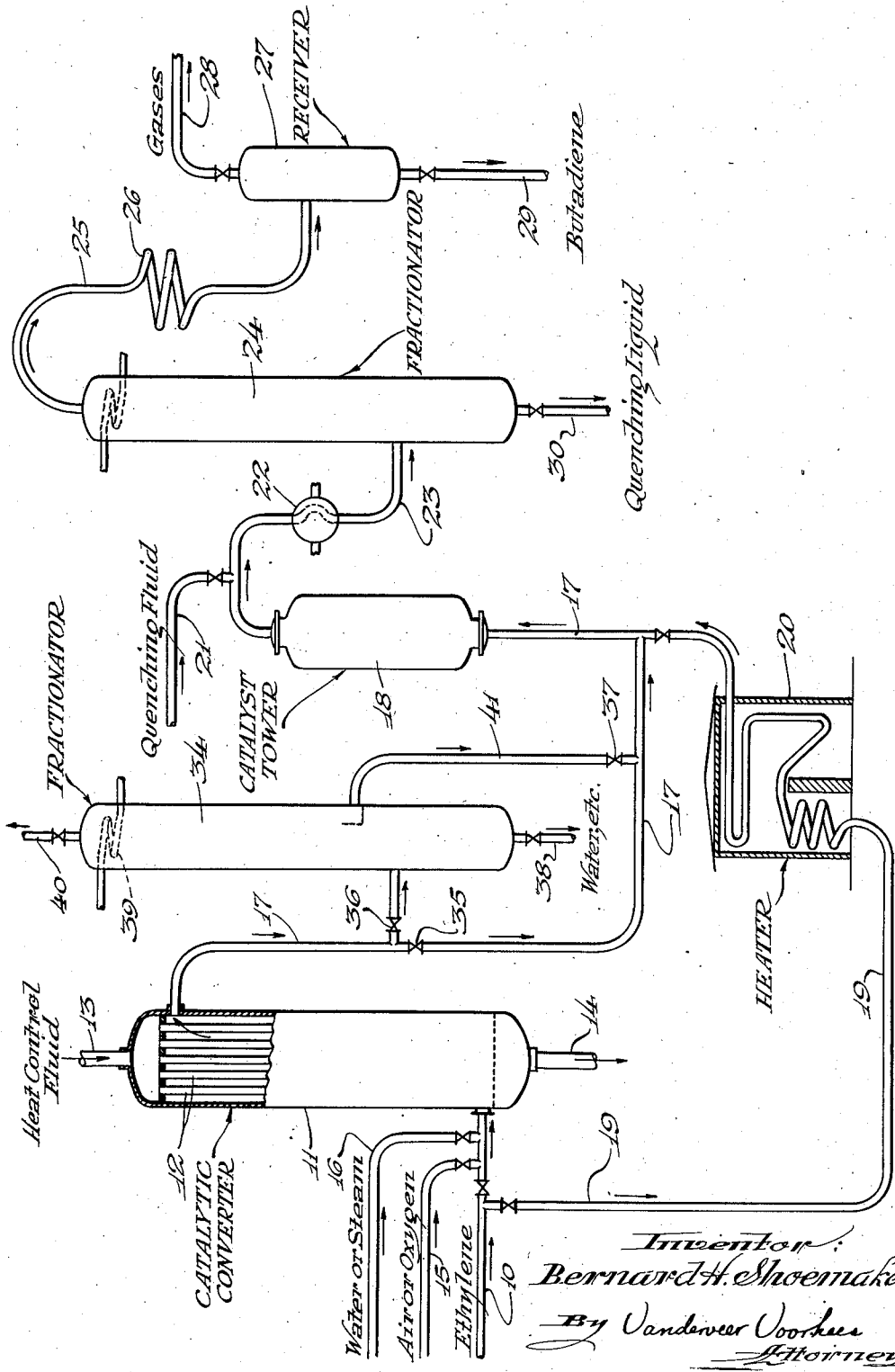

2,376,986

UNITED STATES PATENT OFFICE 2,376,986

CONVERSION OF ETHYLENE TO BUTADIENE

Bernard H. Shoemaker, Hammond, Ind., assignor to Standard Oil Company, Chicago, Ill., a corporation of Indiana Application May 30, 1942, Serial No. 445,110

9 Claims. (Cl. 260—680)

This invention relates to the manufacture of butadiene by a process of condensation from ethylene. The invention relates particularly to the manufacture of butadiene from ethylene in a two stage process giving a high conversion to butadiene in high concentration. One object of the invention is to effect the conversion of ethylene into butadiene without the use of expensive reagents. The invention is illustrated by a drawing which shows diagrammatically an arrangement of apparatus for carrying out the process.

One object of my invention is to provide a process of producing butadiene of sufficient purity for synthetic rubber manufacture. Another object is to produce butadiene from the by-product gases of petroleum refining.

According to my process an ethylene stream is divided and a part is subjected to a preliminary oxidation whereby oxidation products are produced which are subsequently reacted with the other part of the ethylene stream in the presence of a catalyst having a dehydrating action, thereby eliminating oxygen from the oxidized ethylene, principally as water, and effecting condensation between two molecules of ethylene. The initial oxidation of the ethylene is effected under controlled conditions in the presence of a catalyst selected to produce a substantial amount of ethylene oxide as a primary oxidation product. Acetaldehyde and other oxidation products may also be formed. The oxidation may be carried out with or without the addition of steam.

Referring to the drawing, ethylene or gases containing ethylene are charged to the process by line 10 leading to converter 11. Ethylene employed for this purpose may be found in the gases obtained from petroleum oil conversion processes, cracking, reforming, etc. Such gases contain in addition to the ethylene appreciable amounts of ethane and small amounts of hydrogen, propane and propylene. These gases may contain from 10 to 50% or more of ethylene by volume and may be charged to the process without separation, although it is desirable that the gases be free from hydrogen sulfide and sulfur compounds. The gases may also be fractionated under pressure to yield a $C_2$ fraction containing a higher percentage of ethylene.

Converter 11 contains an oxidizing catalyst which is preferably silver deposited on a carrier. Suitable carriers are pumice, asbestos, silica gel, kieselguhr, acid treated clays, such as bentonite, montmorillonite, fuller's earth, etc., bauxite, alumina and the like. A very effective catalyst is made by impregnating silica gel with a solution of silver nitrate followed by drying and gently igniting in the presence of a reducing gas such as hydrogen. Another method involves the precipitation of silver oxalate on the support followed by ignition and reduction to metallic silver. The silver catalyst may be promoted with various other metals such as copper, gold, cobalt, nickel, iron, chromium, molybdenum, vanadium, and manganese. Antimony, bismuth and certain other elements may also be employed as catalysts in converter 11, but in general the elements of group IB of the periodic system are preferred.

It is important to control the temperature of the oxidation reaction in converter 11 within rather close limits, generally within the range of about 150 to 400° C. For this purpose the converter is constructed with an extensive internal heat exchange surface indicated by tubes 12 in the cut-away portion. A cooling or heating fluid is supplied to the exchanger tubes by connections 13 and 14. A suitable fluid for the purpose is water under pressure, oil, molten salts, or molten metal or alloy, e. g., lead or a lead bismuth alloy. The pressure employed in converter 11 may vary over wide limits from atmospheric to 700 pounds per square inch, although generally pressures of 50 to 400 pounds per square inch are preferred.

Oxygen required for the oxidation reaction in converter 11 is supplied by line 15 connected to a source of oxygen or air or other oxygen-containing gas. The amount of oxygen supplied is carefully controlled, usually within the range of about 0.05 to 5 mols of oxygen per mol of ethylene treated. An oxygen mol ratio of about 0.2 to 1 is generally satisfactory. Water or steam may also be supplied to the converted by line 16, either mixed with the ethylene feed gases as indicated or charged to the converter at a plurality of points in the path of the gases flowing therethrough. The introduction of water in this way may be employed to assist in controlling the temperature and absorbing the heat evolved in the reaction. Water in the reaction also tends to increase the production of ethylene oxide and reduce the formation of other oxidation products in the reaction. About ½ to 10 mols of water per mol of ethylene is usually sufficient.

From the converter 11 the gaseous oxidation products are conducted by line 17 to reactor 18 where the second stage of the process is effected. Ethylene from line 19 is heated in heater 20 and mixed with the oxidation products from 11. The reactor 18 may be supplied with suitable heat transfer means to control the reaction temperature. In reactor 18 a condensation is effected between the ethylene and the ethylene oxidation products by the action of a catalyst of the dehydrating type. Suitable catalysts are aluminum oxide, thorium oxide, magnesium oxide, zinc oxide, alumina deposited on silica gel, alumina gel and bauxite or mixtures of any of them. Small amounts of oxides of vanadium, chromium or molybdenum may be present as promoters. Alumina gel prepared from the gelation of alumina sols is particularly effective.

Instead of adding additional ethylene to the ethylene oxidation products charged to reactor 18, I prefer to employ an excess of ethylene in the initial oxygen-ethylene mixture charged to converter 11, sufficient ethylene remaining unreacted in the oxidation products transferred to the second step of the process for that reaction.

The temperature of the reaction in 18 may be within the range of about 350 to 650° C., preferably about 400 to 500° C. The reaction may be conducted at atmospheric pressure, although reduced pressures or superatmospheric pressures of the order of 4 to 10 atmospheres absolute may be employed. The amount of ethylene employed is preferably about 1 to 4 mols per mol of oxygen in the oxidation products from converter 11. The ethylene stream may be heated in heater 20 to a temperature above the reaction temperature sufficient to provide heat for the reaction in 18. The time of contact in the reactor 18 is about 1 to 50 seconds, when operating at about atmospheric pressure, preferably about 5 to 20 seconds, depending on temperature, catalyst activity, etc. When operating at higher pressure, relatively longer contact time, e. g., 40 to 100 seconds, is employed. Feed rates of the order of ½ to 10 kilograms of charge per liter of catalyst are satisfactory.

The gaseous products from 18 are cooled rapidly below the temperature of further reaction after removing from the reactor 18 and this may be most easily accomplished by introducing a quenching liquid at 21. A tubular cooler or condenser 22 may also be employed. A suitable quenching liquid may be water or a quenching oil. Means are provided for the subsequent separation of the water or oil from valuable reaction products.

From cooler 22 the reaction products are conducted by line 23 to fractionator 24 wherein the vapors of butadiene are withdrawn by line 25 to condenser 26 and receiver 27. The temperature of condenser 26 should be maintained well below the boiling point of butadiene, i. e., below about 4° C. Refrigeration will be required, a suitable refrigerant being liquid ammonia capable of producing a temperature of −40° C. when desired. Vapor line 28 may be employed to conduct away from the receiver gaseous products uncondensed in the condenser 26. Where the amount of such uncondensible gases is large, it is preferred to pass them through a suitable absorber to recover butadiene vapors contained therein. Thus, in the case where air is supplied to the process at 15, nitrogen may be present in the gases leaving by line 28. In another modification of the process, to be described hereinafter, such nitrogen may be eliminated at an intervening point. Crude liquid butadiene is withdrawn from the process by line 29 and may be further refined by fractionation or extraction to remove oxygen compounds, etc.

From the bottom of fractionator 24 there may be eliminated by line 30 a heavy product fraction, including the quenching oil or water supplied at 21 when used. Water produced in the reaction will also be eliminated at this point. In converter 11 and also in reactor 18, the catalyst may be regenerated by burning with air or oxygen to remove carbonaceous deposits, care being taken to control the temperature and prevent damage to the catalyst by overheating. Regeneration temperatures of 500 to 650° C. are usually suitable.

The life of the catalyst in 18 may also be increased and the concentration of butadiene in the final product may be increased by subjecting the oxidation products from 11 to a preliminary fractionation before charging to the reactor 18. This may be done by diverting the stream in line 17 through fractionator 34 by closing valve 35 and opening valves 36 and 37. In fractionator 34 there is eliminated any heavy products, for example, water and other products boiling above 30° C. at atmospheric pressure, line 38 being provided for this purpose. Reflux coil 39 effects the condensation of ethylene oxide, acetaldehyde, or other low boiling products, allowing nitrogen, $CO_2$, CO, etc., to be discharged from the system by line 40. The ethylene oxide, aldehyde and other light oxidation products forming a fraction boiling below about 30° C. are withdrawn by valve 37 and line 41 and are charged by line 17 to reactor 18 as hereinbefore described. When operating reactor 18 with the fractionated oxidation products in this manner, the recovery of butadiene from the process is considerably simplified.

The reactions involved in my process are not thoroughly understood but it is believed that one of the important reactions is the formation of ethylene oxide in the oxidation stage followed by the condensation of ethylene oxide and ethylene in the condensation stage. The condensation reaction may proceed through the formation of an intermediate product which may be tetrahydrofurane, or butadiene may be formed directly from the ethylene oxide and ethylene without the formation of an intermediate compound. Intermediate compounds which may be formed, such as tetrahydrofurane, which are not immediately converted in the dehydration step to butadiene, may be recovered from the process and recycled to the dehydration step. Such substances boiling above the boiling point of butadiene may be recovered by refractionating the heavier fraction withdrawn by line 30.

Instead of employing the catalysts in fixed beds as shown in the drawing, I may employ moving catalyst beds to which fresh catalyst is continuously or periodically added and from which spent catalyst is withdrawn for discard or regeneration. I may also operate with upflowing vapors and suspended catalyst which may be in the form of fine granules or powder. When employing suspended catalyst in the oxidation step, I may continuously withdraw, cool and return catalyst to the reactor as a means of controlling the temperature therein.

Although I have described my process with respect to certain specific embodiments thereof, I intend that it be broadly defined by the following claims.

I claim:

1. The process of making butadiene which comprises subjecting ethylene to controlled oxidation with air at about 150 to 400° C. in the presence of an oxidation catalyst, whereby oxidation products of ethylene are produced, the amount of air being sufficient to provide from .05 to 5 mols of oxygen per mol of ethylene treated, and thereafter condensing additional ethylene with said oxidation products in a second stage of the process in the presence of a dehydrating catalyst.

2. The process of claim 1 wherein the oxidation of ethylene is conducted in the presence of a silver catalyst.

3. The process of claim 1 wherein the said dehydrating catalyst is aluminum oxide.

4. The process of claim 1 wherein the condensation of ethylene and oxidized ethylene is effected in the presence of aluminum oxide at a temperature within the range of 350 to 650° C.

5. The process of making butadiene which comprises oxidizing ethylene with oxygen in the proportion of .05 to 5 mols per mol of ethylene in the presence of a silver catalyst at a temperature within the range of about 150 to 400° C., recovering by fractionation from the oxidation products a liquid boiling below about 30° C., contacting said fraction and ethylene for a period of about 1 to 50 seconds, with a dehydrating catalyst maintained at a temperature within the range of about 350 to 650° C., rapidly cooling the products of said reaction, separating butadiene and ethylene from said products and returning said ethylene to said dehydrating catalyst.

6. The process of claim 5 wherein the dehydrating catalyst is aluminum oxide.

7. The process of making butadiene which comprises subjecting a mixture of oxygen and ethylene, in the ratio of about .05 to 5 mols of oxygen per mol of ethylene, to the action of an oxidizing catalyst under controlled temperature conditions, between about 150 and 400° C., whereby oxidation products of ethylene are produced, passing the resulting oxidation products and excess ethylene into contact with a dehydrating catalyst maintained at a temperature above that employed in said oxidation reaction, thereby effecting dehydration and condensation of said ethylene and said oxidation products resulting in the formation of butadiene, and recovering butadiene from the products of said condensation reaction.

8. The process of claim 7 wherein the said condensation reaction is conducted at a temperature of about 350 to 650° C.

9. The process of claim 5 wherein about 0.2 to 1 mol of oxygen is employed per mol of ethylene treated in the oxidizing step.

BERNARD H. SHOEMAKER.